(12) United States Patent
Ye et al.

(10) Patent No.: US 10,540,396 B2
(45) Date of Patent: Jan. 21, 2020

(54) SYSTEM AND METHOD OF PERSONALIZING PLAYLISTS USING MEMORY-BASED COLLABORATIVE FILTERING

(71) Applicant: Pandora Media, LLC, Oakland, CA (US)

(72) Inventors: Tao Ye, Daly City, CA (US); Gordon Parker Rios, Fort Bragg, CA (US)

(73) Assignee: Pandora Media, LLC, Oakland, CA (US)

( * ) Notice: Subject to any disclaimer, the term of this patent is extended or adjusted under 35 U.S.C. 154(b) by 521 days.

(21) Appl. No.: 15/150,240

(22) Filed: May 9, 2016

(65) Prior Publication Data
US 2016/0253416 A1 Sep. 1, 2016

Related U.S. Application Data

(62) Division of application No. 13/835,040, filed on Mar. 15, 2013, now Pat. No. 9,335,818.

(51) Int. Cl.
| | |
|---|---|
| *G06F 16/68* | (2019.01) |
| *G06F 3/01* | (2006.01) |
| *H04N 21/25* | (2011.01) |
| *H04N 21/466* | (2011.01) |
| *H04N 21/475* | (2011.01) |

(Continued)

(52) U.S. Cl.
CPC ............ *G06F 16/686* (2019.01); *G06F 3/01* (2013.01); *G06F 3/0484* (2013.01); *G06F 3/165* (2013.01); *H04N 21/252* (2013.01); *H04N 21/4668* (2013.01); *H04N 21/4756* (2013.01)

(58) Field of Classification Search
None
See application file for complete search history.

(56) References Cited

U.S. PATENT DOCUMENTS

| | | | |
|---|---|---|---|
| 6,412,012 B1 * | 6/2002 | Bieganski | G06Q 30/02 709/232 |
| 7,003,515 B1 | 2/2006 | Glaser et al. | |
| 7,325,043 B1 | 1/2008 | Rosenberg et al. | |

(Continued)

OTHER PUBLICATIONS

Adomavicius, et al., "Toward the Next Generation of Recommender Systems: A Survey of the State-of-the-Art and Possible Extensions, IEEE Transactions on Knowledge and Data Engineering," vol. 17, No. 6, Jun. 2005, 16 pages.

(Continued)

*Primary Examiner* — Wilson Lee
(74) *Attorney, Agent, or Firm* — Fenwick & West LLP

(57) ABSTRACT

Systems and methods are provided for personalizing new song suggestions for a user. A plurality of users provides thumbs up and thumbs down ratings for a pair of songs (song A and B). A first aggregate rating for song B is calculated based on ratings given to song A by all of the users that gave a like rating to song A. Similarly, a second aggregate rating is calculated for song B based on ratings given to song B by all users that gave a dislike rating to song A. Then a user that has not previously rated song B, supplies a rating for song A. A prediction is performed of how the user will rate song B based on the user's rating of song A. For example, the first aggregate rating for song B is used if the user rated song A positively.

20 Claims, 9 Drawing Sheets

(51) Int. Cl.
*G06F 3/0484* (2013.01)
*G06F 3/16* (2006.01)

(56) References Cited

U.S. PATENT DOCUMENTS

| | | |
|---|---|---|
| 7,711,838 B1 | 5/2010 | Boulter et al. |
| 7,962,482 B2 | 6/2011 | Handman et al. |
| 9,367,587 B2 | 6/2016 | Bieschke et al. |
| 2005/0131731 A1 | 6/2005 | Brydon et al. |
| 2006/0212442 A1 | 9/2006 | Conrad et al. |
| 2006/0212444 A1 | 9/2006 | Handman et al. |
| 2006/0254409 A1 | 11/2006 | Withop |
| 2008/0256579 A1* | 10/2008 | Verhaegh ............ H04N 5/44513 725/46 |
| 2010/0273610 A1 | 10/2010 | Johnson |
| 2010/0325135 A1 | 12/2010 | Chen et al. |
| 2011/0060649 A1 | 3/2011 | Dunk et al. |
| 2011/0070819 A1* | 3/2011 | Shimy ............... G06F 17/30032 455/3.05 |
| 2011/0213769 A1 | 9/2011 | Handman et al. |
| 2011/0252947 A1 | 10/2011 | Eaaink et al. |
| 2011/0295843 A1 | 12/2011 | Ingrassia et al. |
| 2012/0054144 A1* | 3/2012 | Barbieri ............ G06F 17/30044 706/52 |
| 2012/0110179 A1 | 5/2012 | Van Coppenholle et al. |
| 2012/0271884 A1 | 10/2012 | Holmes et al. |
| 2012/0284282 A9 | 11/2012 | Ghosh et al. |
| 2012/0303415 A1* | 11/2012 | Edelson ............. G06Q 30/0282 705/7.32 |
| 2012/0317123 A1* | 12/2012 | Green ................ G06F 16/9535 707/748 |
| 2013/0185292 A1* | 7/2013 | Li ..................... G06F 17/30522 707/723 |
| 2013/0246389 A1* | 9/2013 | Osann, Jr. .......... G06F 16/9535 707/710 |
| 2014/0067596 A1* | 3/2014 | McGovern ............ G06Q 30/02 705/26.7 |
| 2014/0074828 A1* | 3/2014 | Mathur ............. G06F 17/30035 707/723 |
| 2016/0255170 A1* | 9/2016 | Gargi ................. G06F 16/9535 709/204 |

OTHER PUBLICATIONS

Basiri, et al., "Alleviating the Cold-Start Problem of Recommender Systems Using a New Hybrid Approach, 2010 5th International Symposium on Telecommunicaitons," IST, 2010,6 pages.
Kim, et al., "A New Approach for Combining Content-Based and Collaborative Filters," J Intell Inf Svst (2006) 27: 79-91, 13 pages.
Lekakos, et al., "A Hybrid Approach for Movie Recommendation," Multimed Tools Appl (2008) 36:55-70, 16 pages.
Pandora Media, Communication pursuant to Rules 161(i) and 162 EPC, EP 14722876.1, dated Oct. 27, 2015, 2 pages.
Pandora Media, International Preliminary Report on Patentability dated Sep. 15, 2015, received in International Application No. PCT/US2014/027750, which corresponds to U.S. Appl. No. 13/835,040, 12 pages.

* cited by examiner

Listener-song rating matrix 402

| | Song A | Song B | Song C | Song D | Song E | Song F |
|---|---|---|---|---|---|---|
| L-ID 1 | 1 | | | | | |
| L-ID 2 | 1 | | 1 | | | |
| L-ID 3 | 1 | | -1 | | | |
| L-ID 4 | -1 | | | -1 | | |
| L-ID 5 | -1 | | | -1 | | |
| L-ID 6 | -1 | | | 1 | | |

Song-song expected ratings matrix

Thumb-Up Matrix 404

| | Song A | Song B | Song C | Song D | Song E | Song F |
|---|---|---|---|---|---|---|
| Song A | | | 0.33 | | | |

Thumb-Down Matrix 406

| | Song A | Song B | Song C | Song D | Song E | Song F |
|---|---|---|---|---|---|---|
| Song A | | | | -0.33 | | |

408, 410, 412, 414

Training Example

Figure 4A

Listener-song rating matrix 402

| | Song A | Song B | Song C | Song D | Song E | Song F |
|---|---|---|---|---|---|---|
| L-ID 1 | 1 | | 1 | | | |
| L-ID 2 | 1 | | 1 | | | |
| L-ID 3 | 1 | | -1 | | | |
| L-ID 4 | | -1 | 1 | -1 | | |
| L-ID 5 | | -1 | 1 | -1 | | |
| L-ID 6 | | -1 | | 1 | | |

Song-song expected ratings matrix

Thumb-Up Matrix 404

| | Song A | Song B | Song C | Song D | Song E | Song F |
|---|---|---|---|---|---|---|
| Song A | | | | | | |
| Song D | | -1(1) | 0.33 (3) | | | |
| Song C | 1(2) | -1(2) | | -1(2) | | |

Training Example

Figure 4B

Song-song expected ratings matrix

Thumb-Down Matrix 406

|  | Song A | Song B | Song C | Song D | Song E | Song F |
|---|---|---|---|---|---|---|
| Song B |  |  | 1(2) | -0.33 (3) |  |  |
| Song C | 1(1) |  |  |  |  |  |
| Song D |  | -1(2) | 1(2) |  |  |  |

Listener-song rating matrix 402

|  | Song A | Song B | Song C | Song D | Song E | Song F |
|---|---|---|---|---|---|---|
| L-ID 1 | 1 |  | 1 |  |  |  |
| L-ID 2 | 1 |  | 1 |  |  |  |
| L-ID 3 | 1 |  | -1 |  |  |  |
| L-ID 4 |  | -1 | 1 | -1 |  |  |
| L-ID 5 |  | -1 | 1 | -1 |  |  |
| L-ID 6 |  | -1 |  | 1 |  |  |

Training Example

Figure 4C

Song-song expected ratings matrix

Thumb-Up Matrix 404

|      | Song A | Song B | Song C | Song D | Song E | Song F |
|------|--------|--------|--------|--------|--------|--------|
| Song A |      |        | 0.33   |        |        |        |

Thumb-Down Matrix 406

|      | Song A | Song B | Song C | Song D | Song E | Song F |
|------|--------|--------|--------|--------|--------|--------|
| Song A |      |        |        | -0.33  |        |        |

Listener-song rating matrix 402

|         | Song A | Song B | Song C | Song D | Song E | Song F |
|---------|--------|--------|--------|--------|--------|--------|
| L-ID 10 | 1      | ?      | 0.33   | ?      | ?      | ?      |
| L-ID 11 | -1     | ?      | ?      | -0.33  | ?      | ?      |

Prediction Example

Figure 5A

Prediction Example

SYSTEM AND METHOD OF PERSONALIZING PLAYLISTS USING MEMORY-BASED COLLABORATIVE FILTERING

RELATED APPLICATION

This application is a divisional application of U.S. patent application Ser. No. 13/835,040, filed Mar. 15, 2013, which is incorporated by reference herein in its entirety.

TECHNICAL FIELD

The disclosed embodiments relate generally to systems and methods for using memory-based collaborative filtering to generate personalized playlists. These systems and methods also select an individual media content item (such as a song) for playback by a user. The playlist or individual media content item is selected based on the user's input regarding other media content items and based on the input of other users who have rated the other media content items similarly to the user.

BACKGROUND

People typically listen to digital music by manually selecting a song or album to listen to. Users may also create a playlist of songs from a variety of albums. Both of these methods, however, require the user to have a copy of the music to play. As users typically do not have an unlimited collection of music, their selection and playback of songs is limited. Some online services exist where users can either purchase individual songs or albums, or purchase a monthly subscription to a pool of music. These services, however, still require the user to manually identify songs for playback.

As it takes time and effort to select songs and albums or to create playlists, many users still choose to listen to broadcast radio stations where someone else manually selects the programming. For example, a commercial "lite rock" FM radio station may review "lite rock" songs, which are manually selected for playback. Such broadcast radio stations, however, cater to large groups of listeners, and, as such, are not customized for individual users.

Accordingly, users typically have to choose between a more individualized listening experience that requires manually identifying and selecting music for playback, or the less individualized listening experience of radio that does not require the user to select songs for playback.

SUMMARY

Given the above disadvantages, it would be advantageous to provide methods and systems for automatically generating playlists for a user from a large library of songs, where the generated playlist takes into account the user's preferences without limiting the user to songs he/she owns or has manually selected. Moreover, it would be advantageous to provide methods and systems for scoring and/or selecting media content items which the user is likely to prefer based on input the user has provided about other media content items and to take advantage of input received from other users who have similar tastes to the user. For example, a system and method which provides songs that other users with similar tastes have preferred would be advantageous. For example, the system could provide information such as "users who also liked song A liked song B." Also, for example the system could provide information such as "users who also didn't like song C liked song D." Additionally, the system and method could allow a user to opt in to receive recommendations from people more like themselves, such as users with similar song (or other media content item) scoring tendencies. Alternatively or additionally, it would be advantageous to provide methods and systems for suggesting or playing a song which the user has not rated or listened to previously based on ratings of that song by people who have similar tastes to the user. It would be advantageous if this suggestion of a new unrated song (or other media content item) could be prepared for playback in real time in response to a user's request.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Some embodiments provide a computer-implemented method of personalizing playback of media to a user. The method is performed on a server system having one or more processors and memory storing one or more programs for execution by the one or more processors to perform the method. A plurality of users each provide like or dislike ratings for at least a first pair of media content items (e.g., songs.) The pair of media content items include a first media content item (e.g., song A) and a second media content item (e.g., song B). A first aggregate rating for the second media content item (e.g., song B) is calculated based on ratings given to the second media content item by all of the users (e.g., listener of a particular channel) that gave the first media content item a like rating (e.g., song B's score in a song A "like matrix"). In some embodiments, the first aggregate rating for the second media content item is also based on the total number of users that gave the first media content item a like rating and gave the second media content item any rating. As explained in more detail in the description of embodiments section, a like rating may be a binary rating such as "thumbs-up" and a dislike rating may be a binary rating like a "thumbs down." A second aggregate rating is calculated for the second media content item based on ratings given to the second media content item by all users that gave the first media content item a dislike rating (e.g., song B's score in the song A "dislike matrix"). In some embodiments, the second aggregate rating for the second media content item is also based on the number of users that gave the first media content item a dislike rating and gave the second media content item any rating. A user that has not previously rated the second media content item (e.g., song B), supplies a rating for the first media content item (e.g., song A). Then, a prediction is performed of how the user will rate the second media content item (e.g., song B) based on the user's rating of the first media content item and either the first aggregate rating for the second media content item or the second aggregate rating for the second media content item. For example, if the user liked song A it is predicted that the user would give song B a score similar to the first aggregate rating for song B. In other words, the user's likely score for song B is predicted to be the average score given to song B by other users who also liked song A, (e.g., the score for song B in the song A like matrix). Then upon predicting that the user will rate the second media content item (e.g., song B) above a first threshold, the second media content item is prepared for playback.

In some embodiments, more than one song rating is used to predict the user's rating of an unrated song. For instance, a plurality of users each provide like or dislike ratings for at least a second pair for media content items. The second pair of media content items comprise a third media content item (e.g., song C) and the second media content item (e.g., song B). It is noted that in some embodiments the plurality of users providing like or dislike ratings for at least the second pair for media content items is the same plurality of users that provided like or dislike ratings for the first pair of media content items. However, in other embodiments these two groups of users providing like or dislike ratings for the pairs of media content items are not identical. A third aggregate rating for the second media content item (e.g., song B) is calculated based on ratings given to the second media content item by all users that gave the third media content item a like rating (e.g., song B's score in the song C like matrix). In some embodiments, the third aggregate rating for the second media content item is also based on the number of users that gave the third media content item a like rating and the second media content item any rating. A fourth aggregate rating for the second media content item (e.g., song B) is calculated based on ratings given to the second media content item by all users that gave the third media content item a dislike rating (e.g., song B's score in the song C dislike matrix). In some embodiments, the fourth aggregate rating for the second media content item is also based on the number of users that gave the third media content item a dislike rating and the second media content item any rating. A user that has not previously rated the second media content item (e.g., song B), supplies a rating for the third media content item (e.g., song C). Then a prediction is performed of how the user will rate the second media content item based on the user's rating of the first media content item (e.g., song A) and either the first aggregate rating for the second media content item or the second aggregate rating for the second media content item, and the user's rating of the third media content item (e.g., song C) and either the third aggregate rating for the second media content item and fourth aggregate rating for the second media content item. For example, if the user liked song A and didn't like song C then it is predicted that the user would give song B a score similar to the first aggregate rating for song B combined with the fourth aggregate rating of song B. In other words, the user's likely score for song B is predicted to be the average score given to song B by other users who also liked song A combined with the average score given to song B by other users who also disliked song C, (e.g., the score for song B in the song A like matrix combined with the score for song B in the song C dislike matrix). Then upon predicting that the user will rate the second media content item above a second threshold, the second media content item is prepared for playback.

Similarly, if the user has rated an additional media content item (e.g., song D), then a prediction of how the user will rate the second media content item (e.g., song B) is based on: (1) the user's rating of the first media content item (e.g., song A) and either the first aggregate rating for the second media content item or the second aggregate rating for the second media content item; (2) the user's rating of the third media content item (e.g., song C) and either the third aggregate rating for the second media content item and fourth aggregate rating for the second media content item; and (3) the user's rating of the additional media content item (e.g., song D) and either a fifth or sixth aggregate rating for the second media content item (where the fifth and sixth aggregate ratings are the ratings for song B in the song D like and dislike matrix respectively).

Some embodiments provide a server system comprising one or more central processing units, CPU(s), for executing programs and also includes memory sorting the programs to be executed by the CPUs. The programs include instructions to perform any or all portions of the aforementioned method of personalizing playback of media to a user.

Yet other embodiments provide a computer readable storage medium storing one or more programs configured for execution by a computer. The programs include instructions to perform any or all portions of the aforementioned method of personalizing playback of media to a user.

These methods, systems, and computer readable storage mediums provide new, less cumbersome, more efficient ways to predict how a user will rate an unrated media content item. As such, they also provide new ways to prepare lists of scored media content items which are used to prepare a media content item for playback which the user will likely enjoy. Other details, features and advantages of embodiments of the invention will become apparent with reference to the following detailed description and figures.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 4A is block diagram illustrating an example of calculating and storing aggregate ratings for exemplary items based on feedback for item pairs received from a plurality of users as described in FIG. 3A (e.g., the aggregate ratings of songs C and D being stored item A like and dislike matrixes).

FIG. 4B is block diagram illustrating another example of calculating and storing aggregate ratings for exemplary items based on feedback for item pairs received from a plurality of users described in FIG. 3A (e.g., aggregate ratings for numerous item pairs being stored in a single like matrix).

FIG. 4C is block diagram illustrating another example of calculating and storing aggregate ratings for exemplary items based on feedback for item pairs received from a plurality of users described in FIG. 3A (e.g., aggregate ratings for numerous item pairs being stored in a single dislike matrix).

FIG. 5A is block diagram illustrating an examples of predicting an aggregate rating for a user's unrated item based on a user's rating of another item as described in FIG. 3B (e.g., a rating for song C is predicted based user 10's like rating of song A, and a rating for song D is predicted based on user 11's dislike rating of song A).

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present embodiments. However, it will be apparent to one of ordinary skill in the art that the various embodiments may be practiced without these specific details. In other instances, well-known methods, procedures, components, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the first element are renamed consistently and all occurrences of the second element are renamed consistently. The first element and the second element are both elements, but they are not the same element.

The terminology used in the description of the embodiments herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, integers, steps, operations, elements, and/or components, but do not preclude the presence or addition of one or more other features, steps, operations, elements, components, and/or groups thereof.

As used herein, the term "if" may be construed to mean "when" or "upon" or "in response to," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Figure 1:
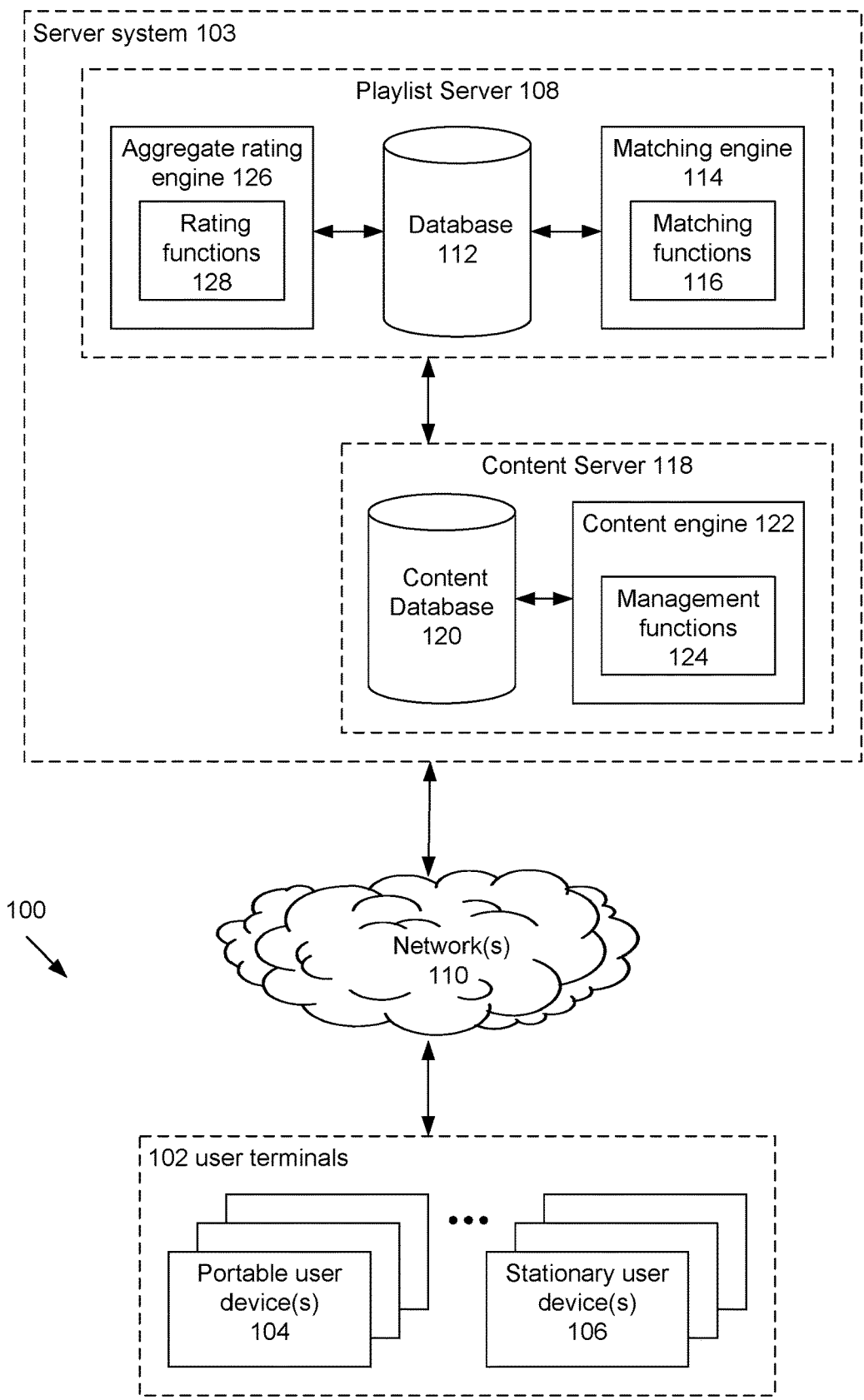
FIG. 1 is a block diagram illustrating an exemplary operating system, in accordance with some embodiments.

FIG. 1 is a block diagram illustrating an exemplary system 100 that may be used to implement embodiments of the invention. A plurality of user terminals 102 (e.g., one or more portable devices 104 such as a cell phones, portable music players, vehicle music players, tablets, laptops, etc) (and/or e.g., stationary devices 106 such as desk top computers, fixed media systems, personal or group networks, etc) are coupled via one or more communication networks 110 to a server system 103 including a playlist server 108 and content server 118. It is noted that a plurality of user terminals may be associated with one user's account. Furthermore, the server system 103 is capable of communicating with numerous users simultaneously. In some embodiments, the playlist server 108 and the content server 118 are components of a single server 103, which performs all functions of the playlist server 108 and the content server 118. The terminals 102, playlist server 108, and content server 118, each comprise one or more processing units (CPU's), one or more network or other communications interfaces, memory, and one or more communication buses for interconnecting these components to other conventional electronic components and may be programmed with processor-executable instructions to facilitate communication via network 110 and perform various aspects of the below describe embodiments.

In some embodiments, one or more of the user terminals 102 have a user interface comprising a display device, an input mechanism such as a keyboard or voice activated input mechanism, a media playing mechanism (such as a speaker or an audio-out jack), and optionally a GPS system. In some embodiments, the input mechanism of one of the terminals 102 is used to receive feedback associated with a user, such a user's as ratings of items (like songs).

In some embodiments, a user provides a media input seed. In some embodiments, a media input seed is a song that the user selects to start an automatically generated user specific playlist or a station that plays songs related to the media input seed (e.g., the song) selected. In other embodiments, the media input seed is an artist's name, a genre, an album name, a composer name, a lyricist name, a director name, a movie title, a producer name, a TV station name, a DJ name; and the like.

In some embodiments, the one or more of the user terminals' 102 interfaces enables a user to interact with the server system 103. The user interfaces may allow a user to utilize a variety of functions, such as displaying information from the server system 103, requesting additional information from server system 103, customizing local and/or remote aspects of the system, and controlling local and/or remote aspects of the system as described in U.S. Pat. Pub. No. 2006/0212442, incorporated herein by reference. In some embodiments, user terminals 102 are operated in a client-server configuration to permit a user to retrieve web pages from the server system 103. Furthermore, any of various conventional web browsers can be used to display and manipulate data on the web pages. In yet other embodiments, TV equipment, audio equipment, DVD players, and the like are utilized as user terminals. As such, the users have various mechanisms with the ability to provide feedback, such as ratings regarding songs or other items provided to them by the server system.

Memory used by any of terminals 102, playlist server 108, and content server 118 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory optionally includes one or more storage devices remotely located from the CPU(s). In some embodiments, memory, or alternately the non-volatile memory device(s) within memory, comprises a non-transitory computer readable storage medium (as explained in more detail for the playlist server 108 and content server 118 with respect to FIG. 2).

One skilled in the art will appreciate that the network 110 is not limited to a particular type of network. For example, the network 110 may feature one or more wide area networks (WANs), such as the Internet. The network 110 may also feature one or more local area networks (LANs) having one or more of the well-known LAN topologies and the use of a variety of different protocols on these topologies, such as Ethernet, TCP/IP, Frame Relay, Ethernet, FTP, HTTP and the like, is presumed. Moreover, the network 110 may feature a Public Switched Telephone Network (PSTN) featuring land-line and cellular telephone terminals, LTE, GSM, CDMA and other mobile data networks, or else a network featuring a combination of any or all of the above. The user terminals 102, (e.g., 104 and/or 106) may be coupled to network 110 via, for example, twisted pair wires, coaxial cable, fiber optics, electromagnetic waves or other media.

In some embodiments playlist server 108 contains a database of items 112, including a plurality of channels, each containing a list of media content items as explained U.S. patent application Ser. No. 13/647,993, incorporated herein by reference. The playlist server 108 also stores playlists associated with one or more users. In some embodiments, the playlist server 108 does not contain the database of items 112, as illustrated here, but is instead coupled to a separate database of items 112. For example, playlist server 108 may be coupled to a "MUSIC GENOME PROJECT" database as described in Applicant's U.S. Pat. No. 7,003,515 incorporated herein by reference in its entirety, as well as a variety of other databases containing channels of media content items. In some embodiments, the playlist server 108 also contains or is coupled to a matching engine 114. The matching engine 114 utilizes an associated set of search and matching functions to operate on the database of items 112 as described in Applicant's U.S. Pat. No. 7,962,482, which is incorporated herein by reference in its entirety. For example, in one embodiment the matching engine 114 is utilized with the "MUSIC GENOME PROJECT" database, and the matching engine 114 utilizes search and matching functions implemented in software or hardware to effectively calculate the "distance" between a source song and other songs in the database (as described in U.S. Pat. No. 7,003,515), and then sorts the results to yield an adjustable number of closest matches.

In some embodiments, the playlist server 108 also contains or is coupled to an aggregate rating engine 126. The aggregate rating engine 126 is used to calculate aggregate ratings for items, such as media content items and then use the aggregate ratings to provide a user with a personalized recommendation. In some embodiments, the aggregate rating engine 126, is utilized to prepare a playlist of media content items. The aggregate ratings can be used to create a personalized channel of media content items which can be used conjunction with a plurality of channels to provide personalized recommendations using various methods, selection functions, and weighing various factors as explained in more detail with respect to U.S. patent application Ser. No. 13/647,993, incorporated herein by reference.

In some embodiments, the content server 118 contains a database of media content items 120. In other embodiments, the content server 118 is wholly or partially integrated with playlist server 108. In some embodiments, the playlist server 108 does not contain the database of media content items 120 but is separately coupled to the database of media content items 120. The content server 118 may also contain or be coupled to a content engine 122. The content engine 122 utilizes an associated set of management functions 124, such as standard finding, packaging and sending functions, to operate on the database of content items 122. In one embodiment of the invention, for example, content engine 122 utilizes management functions implemented in software or hardware to control the transmission of media content items by, for example, streaming and/or downloading the media items to user terminals 102.

Figure 2:
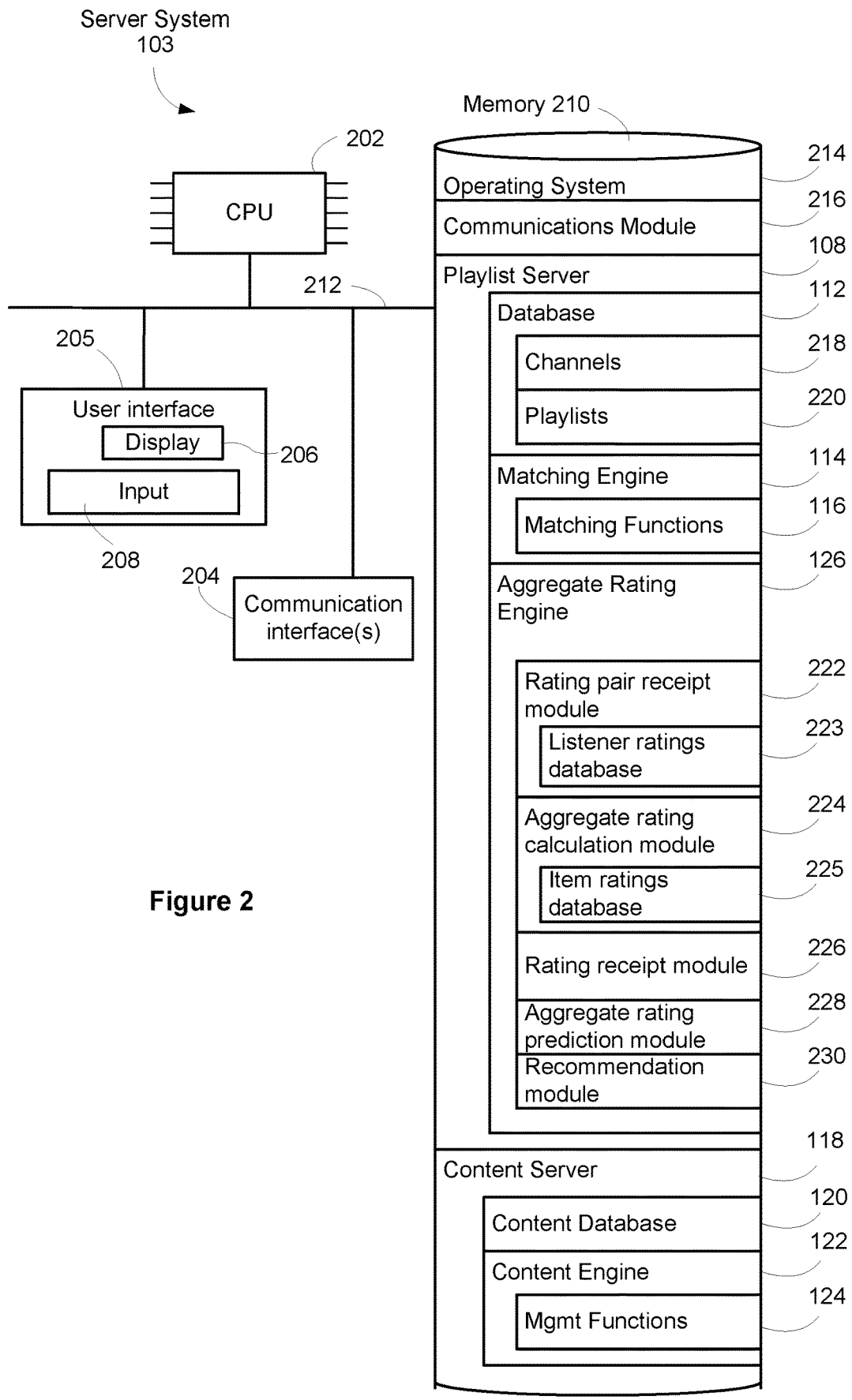
FIG. 2 is a block diagram illustrating an exemplary server system suitable for implementing some embodiments.

FIG. 2 is a block diagram illustrating an exemplary server system 103 suitable for implementing some embodiments. The server system 103 typically includes one or more processing units (CPU's) 202, one or more network or other communications interfaces 204, memory 210, and one or more communication buses 212 for interconnecting these components. The communication buses 212 optionally include circuitry (sometimes called a chipset) that interconnects and controls communications between system components. The server system 103 optionally includes a user interface 205 comprising a display device 206 and an input mechanism 208 (such as keyboard). Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 optionally includes one or more storage devices remotely located from the CPU(s) 202. Memory 210, or alternately the non-volatile memory device(s) within memory 210, comprises a non-transitory computer readable storage medium. In some embodiments, memory 210 or the computer readable storage medium of memory 210 stores the following programs, modules and data structures, or a subset thereof:

- an operating system 214 that includes procedures for handling various basic system services and for performing hardware dependent tasks;
- a network communication module 216 that is used for connecting the server system 103 to other computers via the one or more communication network interfaces 204 (wired or wireless) and one or more communication networks, such as the Internet, other wide area networks, local area networks, metropolitan area networks, and so on;
- a playlist server 108 which contains or is coupled to:
  - a database of items 112, including:
    - a plurality of channels 218, each containing a list of media content items and their associated channel specific scores, as described in more detail with respect to U.S. patent application Ser. No. 13/647,993 (incorporated herein by reference); and
    - a plurality of playlists 220, wherein in some embodiments the stored playlists include received or aggregated ratings associated with various media content items on the playlist obtained or calculated as described with respect to FIGS. 3A and 3B;
  - a matching engine 114 that utilizes an associated set of search and matching functions 116 to operate on the database of items 112 as described in U.S. Pat. No. 7,962,482 (incorporated herein by reference);
  - an aggregate rating engine 126 for to calculating aggregate ratings of items, such as media content items, and then utilizing the aggregate ratings to provide a user with a personalized recommendation of items the user has not previously rated using various modules including:

- a rating pair receipt module 222 for obtaining or receiving feedback in the form of ratings of pairs of items from a plurality of users the rating are stored in a listener ratings database 223 such as the listener song matrix 402 as shown in FIG. 4A;
- an aggregate rating calculation module 224 for calculating aggregate ratings for the pairs of items (for example, an aggregated rating of one item in a pair is calculated based on positive ratings of another item in the pair from a plurality of users). These aggregated calculations are stored in an item ratings database 225, such as the thumbs up matrix 404 or the thumbs down matrix 406 shown in FIG. 4A) In some embodiments, the items ratings database 225 is combined with the listener ratings database 223 to form a general ratings database;
- a rating receipt module 226 for receiving a single rating from a user (for example, the user provides a rating of only one item of an item pair). In some embodiments, the rating receipt module 226 is a part of the rating pair receipt module 222 (forming a single ratings receipt module) and the single user rating is stored in the listener ratings database 223 associated with the user's ratings (such as the listener-song rating matrix 402 shown in FIG. 5A);
- an aggregate rating prediction module 228 for predicting how a user will rate an unrated item based on the user's rating of at least one other item (as explained in more detail with respect to FIG. 3B). In some embodiments, aggregate ratings are also stored in the listener ratings database 223 (such as the listener-song matrix 402 shown in FIG. 5B); and
- a recommendation module 230 for utilizing rating prediction scores from the prediction module 228 to provide a user personalized recommendation, such as preparing a new item for playback if the predicted rating is above a threshold;

a content server 118 which is wholly or partially integrated with playlist server 108 and contains or is coupled to:

- a database of media content items 120, including the media files to be sent to the user for play (audio, audiovisual etc) and any content associated with the media content items; and
- a content engine 122 which utilizes an associated set of management functions 124, such as standard finding, packaging and sending functions, to operate on the database of content items 122 to control the transmission of media content items by, for example, streaming and/or downloading to user terminals (FIG. 1, 102).

Each of the above identified elements is typically stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 210 stores a subset of the modules and data structures identified above. Furthermore, memory 210 may store additional modules and data structures not described above.

Although FIG. 2 shows a server system 103, FIG. 2 is intended more as functional description of various features present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement the server system 103 and how features are allocated among them will vary from one implementation to another, and typically depend in part on the amount of data traffic that the system must handle during peak usage periods as well as during average usage periods.

Figure 3A:
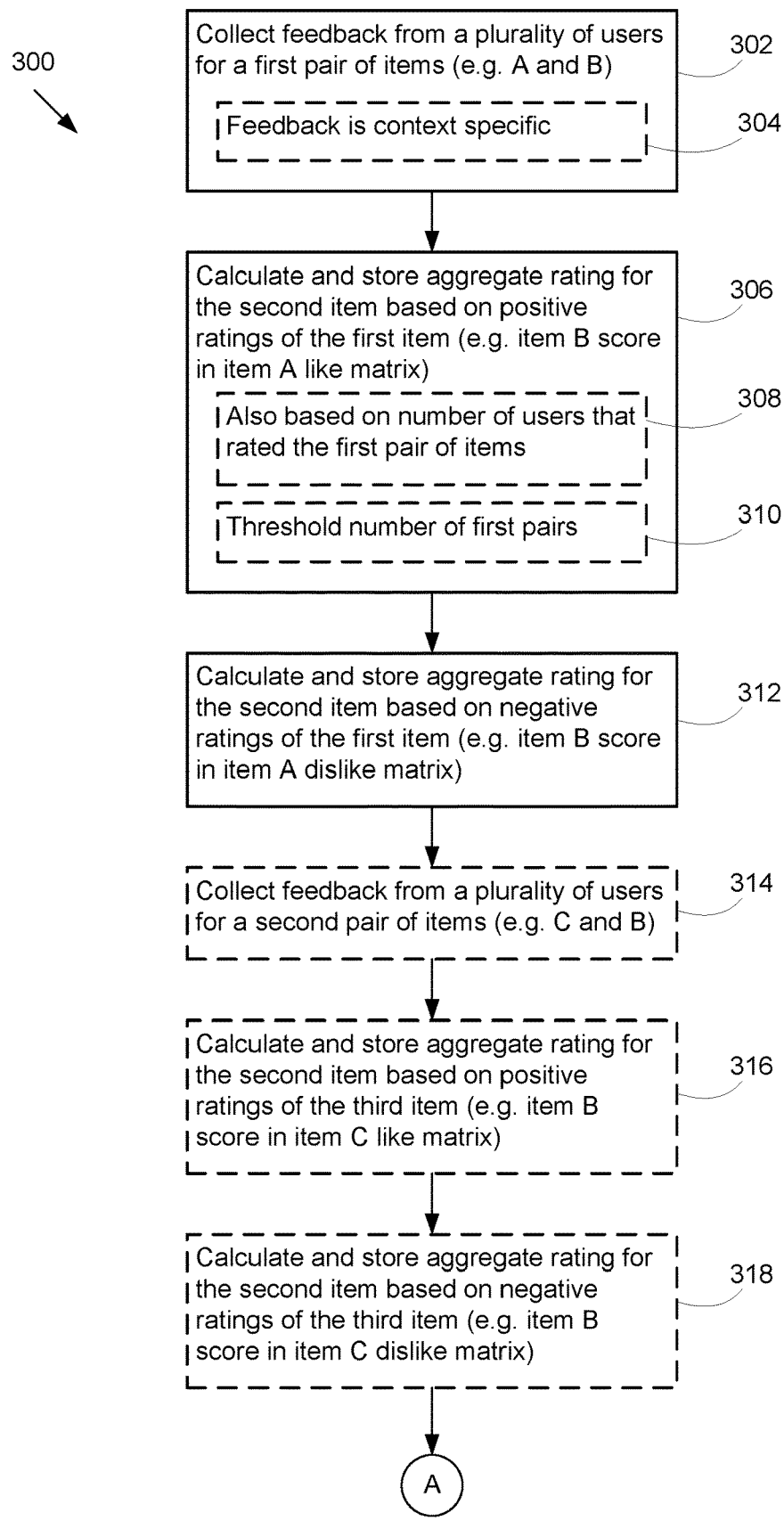
FIG. 3A is a flow chart representing an exemplary overview of a method used to calculate aggregate ratings for items from feedback on pairs of items received from a plurality of users, in accordance with some embodiments.

FIG. 3A is a flow chart representing an exemplary overview of a method (300) used to calculate aggregate ratings for items from feedback on pairs of items received from a plurality of users, in accordance with some embodiments. The method (300) is executed by, for example, the system depicted in FIGS. 1 and 2. Method (300) is typically governed by instructions that are stored in a computer readable storage medium and that are executed by one or more processors of one or more servers system 103. Each of the operations that are shown in FIG. 3A typically corresponds to instructions stored in a computer memory or non-transitory computer readable storage medium. The computer readable storage medium typically includes a magnetic disk storage device, solid state storage devices such as Flash memory, or other non-volatile memory device or devices. The computer readable instructions stored on the computer readable storage medium are stored in source code, assembly language code, object code, or any other suitable instruction format that can be interpreted by one or more processors. Specifically, many of the operations shown in FIG. 3A correspond to instructions in various modules of the playlist server 108 especially the aggregate rating engine 126 and/or content server 118 of the server system 103 shown in FIG. 2.

The server system 103 (FIG. 1) collects feedback from a plurality of users for a plurality of items and uses it to perform various functions. Feedback regarding any two items collected from the same user can be considered a pair of items. As such, in embodiments described herein a first pair of items will be described. However, it is noted that it many instances many users provide feedback for numerous pairs of items. Furthermore, the interaction between feedback provided for numerous pairs of items will be described herein. As such, the method (300) first includes collecting feedback from a plurality of users for a first pair of items (302). It is noted that a pair of items is sometimes referred to herein as a rating pair, or a song pair framework. In some embodiments, the collection of feedback includes receiving from a plurality of users either a like or a dislike rating for each item in at least a first pair of items.

It is noted that the items, for which the feedback is collected, can include media content items such as songs, vocal performances, instrumental performances, audio recordings, videos, movies, slide show, animations, lectures, media files, or other presentations of information that typically include at least an audio component and may include a video component. Items can also include things other than media content items such as strictly visual items, products, or reviews of services, etc. In this disclosure, the methods are explained with reference to media content items, often specifically with reference to songs. However, it should be noted that it is possible to use the methods described herein in contexts other than the media content items or songs described herein as examples.

It is also noted that the feedback collected from the plurality of users (302) can include a variety of information such as explicit or implicit rating of each item. For example, it may include an explicit binary rating, such as a "thumbs up/thumbs down" or "+1/−1" or "smile face/sad face" etc. For example, the user has clicked on a "thumbs up" icon (or thumbs down icon) while listening to that song on an internet radio station. Other explicit ratings may be non-binary such as a range of scores, such as a numerical rating (e.g., rating ranges of: 1-5, 1-10, or 1-100) or similarly a certain number of "stars", "smiles", or other indication of approval or disapproval. Furthermore, some ratings may be implicit such as "skipping" a song provided on a play list on an internet radio station means that it is disliked. In some embodiments when the provided ratings is not binary, the feedback is classified into negative and positive before proceeding with the below described method. For example, in some embodiments the ratings receipt module 226 and/or rating pair receipt module 222 perform the classification of non-binary ratings to negative and positive ratings.

The method (300) described herein provides a description of how ratings of some items are used to calculate aggregate ratings for other items. However, it is noted that in some embodiments, in addition to ratings of the items, the feedback also includes contextual information associated with the item (304). For example, the feedback may be specific to the station on which the rated song was/is playing. In some embodiments, the calculated aggregated ratings described herein are specifically related to feedback context. In some embodiments, only the like and dislike ratings received from the plurality of users on a first station, associated with a common media input seed, are used to calculate aggregate ratings related to that first station. This first station may be associated with a media input seed such as a song name, an artist name, an album name, a composer, a genre, or the like. For example, in some instances only the like and dislike ratings for songs on the "Adele" station are used to calculate aggregate song ratings for other songs on the "Adele" station. Similarly, other contextual information collected at 304 may be used to limit and thus more accurately provide personalized aggregate ratings. Furthermore, in other embodiments contextual information will be used to augment aggregated ratings and/or used to influence a final selection of a media content item for playback. In other embodiments, the aggregate ratings and/or selection of a media context item for playback does not take into account contextual information. While the exemplary method (300) focuses on how feedback ratings are used regardless of whether contextual information is used (or not), a brief listing of contextual information is provided below.

Examples of contextual information include, but are not limited to, the station on which the current song is playing, the song played immediately prior to the current song, the artist of the song playing immediately prior to the current song, one or more musicological characteristics of the prior song(s), the artist of the current song, the album containing the current song, time of day, day of week, calendar day (i.e., date), location of user (e.g., work, home, car, zip code, country, etc.), and user demographics (e.g., age, gender). Some contextual information may be related to the current song in the context of extrinsic factors, such as location of user (i.e., geography), user demographics, and/or time period (e.g., time of day, day of week, calendar date). Meanwhile, some contextual information may be related to the current song in the context of at least one of the following: particular artist, particular album, and/or particular station. In addition, some contextual information may be related to the current song in the context of a second content item (e.g., an immediately prior song). Moreover, some contextual information may be related to the current song in the context of characteristics of a second content item (e.g., characteristics of an immediately prior song such as treble, bass, vocals, etc.). Various other types of contextual information will be clear to one of skill in the art after thorough review of the entirety of the disclosure.

In some embodiments, collection of feedback (302) is performed only when feedback for a particular item reaches a threshold. For example, in some embodiments, like and dislike ratings are collected only when at least a threshold number of ratings have been collected for a particular. The threshold may be N, where N is a positive integer. In some embodiments N is at least 10, N is at least 20, or N is at least 50.

After feedback is collected from a plurality of users for a first pair of items (302), including a first item and a second item, an aggregate rating for the second item is calculated and stored based on the positive ratings of the first item (306). Specifically, in some embodiments, calculating this (first) aggregate rating for a second media content item is based on ratings given to the second media content item by all users that gave a first media content item a like rating. In some embodiments, this aggregate rating is also based on the number of users that rated the first pair of items, or more precisely it is based on the number of users that gave the first item a positive rating, such as a like rating, and gave the second media content item any rating, such as a like or dislike rating (308).

Furthermore, it is noted that in some embodiments, before the aggregate rating for the second item is calculated, a determination is made that the first pair of items have been rated at least a threshold number of times (310). For example, in some embodiments, an aggregate score for the second song is calculated only when a first song pair, which includes the second song, has been rated on a particular station at least a threshold number of times. The threshold may be M, where M is a positive integer. In some embodiments M is at least 5, M is at least 10, or M is at least 20. For an exemplary illustration of calculating and storing aggregate ratings for one item in a pair of items based on positive ratings of the other item in the pair of items see FIG. 4B, which illustrates aggregate ratings for numerous item pairs being stored in a single like matrix.

Furthermore, after feedback is collected from a plurality of users for a first pair of items (302), including a first item and a second item, an aggregate rating for the second item is calculated and stored based on negative ratings of the first item (312). Specifically, in some embodiments, calculating this (second) aggregate rating for the second media content item is based on ratings given to the second item by all users that gave a first item a dislike rating. The aggregate ratings for the second item are not necessarily negative just because the first item had a negative rating. In some embodiments, the aggregate rating of the second item falls between a range of 0 and 1. For example, it is possible that many people who give "Gravity" a dislike rating may give "Chasing Pavements" a like rating. It is noted that step (312), can be performed before, after, or at the same time as the step (306). Although not explicitly illustrated for space and clarity reasons, the other details described in step (306) are also true in step (312). Specifically, in some embodiments, this aggregate rating is also based on the number of users that rated the first pair of items, or more precisely it is based on the number of users that gave the first item a negative rating, such as a dislike rating, and gave the second media content item any rating, such as a like or dislike rating. Furthermore, it is noted that in some embodiments, before the aggregate rating for the second item is calculated, first a determination is made that the first pair of items have been rated at least a threshold number of times. For example, in some embodiments, an aggregate score for the second song is calculated only when a first song pair, which includes the second song, has been rated on a particular station at least a threshold number of times. The threshold may be M, where M is a positive integer. For an exemplary illustration of calculating and storing aggregate ratings for one item in a pair of items based on negative ratings of the other item in the pair of items see FIG. 4C, which illustrates aggregate ratings for numerous item pairs being stored in a single dislike matrix.

In some embodiments, the method of steps (302) to (312) described above, is performed for media content items as follows. A plurality of users each provide like or dislike ratings for at least a first pair of media content items (such as songs) (302). The pair of media content items include first media content item (e.g., song A) and a second media content item (e.g., song B). A first aggregate rating for the second media content item (song B) is calculated based on ratings given to the second media content item by all of the users that gave the first media content item a like rating (e.g., song B's score in the song A like matrix) (306). In some embodiments, the first aggregate rating for the second media content item is also based on the total number of users that gave the first media content item a like rating and the second media content item any rating. A second aggregate rating is calculated for the second media content item based on ratings given to the second media content item by all users that gave the first media content item a dislike rating (e.g., song B's score in the song A dislike matrix) (312). In some embodiments, the second aggregate rating for the second media content item is also based on the number of users that gave the first media content item a dislike rating and the second media content item any rating.

Furthermore, in some embodiments, prior to calculating the first and second aggregate rating for the second media content item, the first pair of media content items is determined to have been rated a least a threshold number of times. In some embodiments, like ratings are +1 and dislike ratings are −1. Furthermore, the first and second aggregate ratings each fall between a range of −1 and +1.

In some embodiments, calculating the first aggregate rating for the second media content item and the second aggregate rating for the second media content item are performed off-line. These calculations can be performed in low server usage times such as overnight, and may be updated periodically (such as hourly, daily, or weekly). In other embodiments, the aggregate ratings are updated continuously, or semi-continuously. For example, the aggregate ratings may be triggered to update every time a new item pair is received from a user in the plurality of users, or every time a threshold number of new item pairs are received. As such, in some embodiments, the calculation of the first and second aggregate ratings is performed prior to receiving a request to prepare a media content item for playback. However, in other embodiments, calculating the first aggregate rating for the second media content item and the second aggregate rating for the second media content item are performed in response to a request to prepare a media content item for playback. In some embodiments, calculating first and second aggregate ratings is performed in under 5 minutes.

The method (300) optionally includes collecting feedback from a plurality of users for a second pair of items (314). All of the definitions of feedback, and items, thresholds, etc., described with respect to step (302) are also true for step (314). In some embodiments, a second pair of items includes a third item and the second item.

After feedback is collected from a plurality of users for a second pair of items (314), including the third item and the second item, an aggregate rating for the second item is calculated and stored based on positive ratings of the third item (316). Specifically, in some embodiments, calculating a third aggregate rating for the second media content item is based on ratings given to the second media content item by all users that gave the third media content item a like rating. Although not explicitly illustrated for space and clarity reasons, the other details described in step (306) are also true in step (316). Specifically, in some embodiments, this (third) aggregate rating is also based on the number of users that rated the second pair of items, or more precisely it is based on the number of users that gave the third item a positive rating, such as a like rating, and gave the second media content item any rating, such as a like or dislike rating. Furthermore, it is noted that in some embodiments, before the aggregate rating for the second item is calculated, a determination is made that the second pair of items have been rated at least a threshold number of times.

Similarly, after feedback is collected from a plurality of users for a second pair of items (314), including a third item and a second item, an aggregate rating for the second item is calculated and stored based on negative ratings of the first item (318). Specifically, in some embodiments, calculating a (fourth) aggregate rating for the second media content item is based on ratings given to the second media content item by all users that gave the third media content item a dislike rating. As described with respect to step (312) this aggregate rating for the second item is not necessarily negative just because the third item had a negative rating. Likewise, as noted with respect to step (312), the calculation of step (318) can be performed before, after, or at the same time as the step (316). Although not explicitly illustrated for space and clarity reasons, the other details described with respect to step (306) are also true with respect to step (318). Specifically, in some embodiments, this (fourth) aggregate rating is also based on the number of users that rated the second pair of items, or more precisely it is based on the number of users that gave the third item a negative rating, such as a dislike rating, and gave the second media content item any rating, such as a like or dislike rating. Furthermore, it is noted that in some embodiments, before the aggregate rating for the second item is calculated, first a determination is made that the second pair of items have been rated at least a threshold number of times.

In some embodiments, the method of step (314) to (318) described above, is performed for media content items as follows. A plurality of users each provide like or dislike ratings for at least a second pair for media content items (314). The second pair of media content items comprises a third media content item (e.g., song C) and the second media content item (e.g., song B). It is noted that in some embodiments the plurality of users providing like or dislike ratings for at least the second pair for media content items is the same plurality of users that provided like or dislike ratings for the first pair of media content items (at 302). However, in other embodiments these two groups of users providing like or dislike ratings for the pairs of media content items are not identical. A third aggregate rating for the second media content item (e.g., song B) is calculated based on ratings given to the second media content item by all users that gave the third media content item a like rating (e.g., song B's score in the song C like matrix) (316). In some embodiments, the third aggregate rating for the second media content item is also based on the number of users that gave the third media content item a like rating and the second media content item any rating. A fourth aggregate rating for the second media content item (e.g., song B) is calculated based on ratings given to the second media content item by all users that gave the third media content item a dislike rating (e.g., song B's score in the song C dislike matrix) (318). In some embodiments, the fourth aggregate rating for the second media content item is also based on the number of users that gave the third media content item a dislike rating and the second media content item any rating.

The general formula for determining aggregate ratings for two pairs of items is provided below. The algorithm produces a score for each target item from a source item in an item pair. The aggregate rating will range from −1 to +1.

For a set of rating pairs (e.g., song A and song B rated by the same people), the calculated expected value of song B, when song A is rated a value of "t" is described as:

$$E(t_B \mid t_A = 1) = P(t = 1) * 1 + P(t = -1) * (-1),$$

where $$t \in Tab_{B|A=1},$$

$$E(t_B \mid t_A = 1) = \frac{\sum_{t=1}^{t} t}{|Tab_{B|A=1}|} - \frac{\sum_{t=-1}^{t} t}{|Tab_{B|A=1}|} = \frac{\sum t}{|Tab_{B|A=1}|},$$

where "t" is the rating value (e.g. a thumbs up or thumbs down value),

E(t_B|t_A=1) is the expected value of rating on song B given that a user's rating for song A is 1 (thumb-up), T_ab is a set of rating pairs of song A and song B rated by the same people.

T_ab B|A=1 is a set of ratings of the A/B pair of ratings, where song A is rated 1 (thumbed up).

The same algorithm is used to generate an expected value for all songs when song A is rated −1 (thumb down) (where T_ab B|A=−1 is a set of ratings for song B of the A/B pair of ratings, where song A is rated −1 (thumbed down)) and (where t_B|t_A=−1) is the expected value of rating on song B given that a user's rating for song A is −1 (thumb-down).

It is noted that although the above formula is explained in terms of binary ratings of songs the same or similar formula may also be used for non-binary ratings of any item (other media content items or otherwise as defined above.) However, non-binary ratings would first be classified into negative or positive rating before using this formula.

Figure 3B:
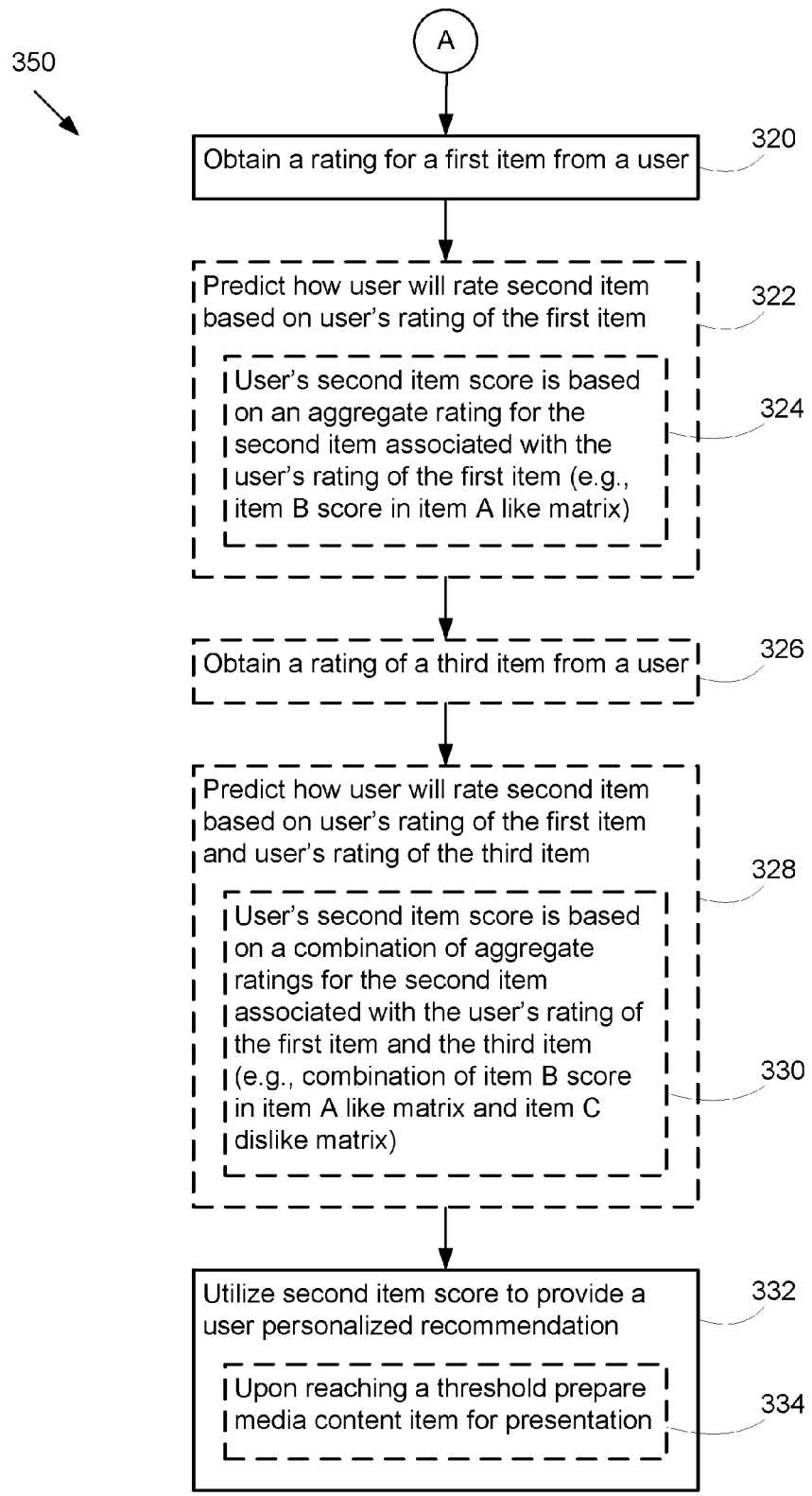
FIG. 3B is a flow chart representing an exemplary overview of a method used to predict how a user will rate an unrated item based on one or more of the user's ratings of other items, in accordance with some embodiments.

FIG. 3B is a flow chart representing an exemplary overview of a method (350) used to predict how a user will rate an unrated item based on one or more user ratings of other items, in accordance with some embodiments. It is noted that method (350) utilizes the aggregate ratings calculated in method (300), and as such is illustrated as a continuation of the method flow chart started in FIG. 3A. The method (350) is executed by, for example, the system 103 depicted in FIGS. 1 and 2. Method (350) is typically governed by instructions that are stored in a computer readable storage medium and that are executed by one or more processors of one or more servers system 103. Each of the operations that are shown in FIG. 3B typically corresponds to instructions stored in a computer memory or non-transitory computer readable storage medium. The computer readable storage medium typically includes a magnetic disk storage device, solid state storage devices such as Flash memory, or other non-volatile memory device or devices. The computer readable instructions stored on the computer readable storage medium are stored in source code, assembly language code, object code, or any other suitable instruction format that can be interpreted by one or more processors. Specifically, many of the operations shown in FIG. 3B correspond to instructions in various modules of the playlist server 108 and/or content server 118 of the server system 103 shown in FIG. 2.

The server system 103 (FIG. 1) obtains a rating of a first item from a user (320). In some embodiments, the user is distinct from the plurality of users that provided feedback in method (300), while in other embodiments the user is one of the plurality of users that provided feedback in the method (300). The user first item is a part of a pair of items in which the user has not rated the second item in the pair. For example, in some embodiments, the system receives from a user that has not previously rated the second media content item, a rating for the first media content item.

The system then predicts how the user will rate an unrated item based on the user's rating of the first item (322). Specifically, the method (350) calculates a predicted item score for a second item based on an aggregate rating for the second item associated with the user's rating of the first item (324). For example, if the user scored the first item positively, then the predicted score for second item will be obtained using the aggregated rating of the second item associated with positive ratings of the first item (i.e., the aggregate score calculated at 306). Similarly, if the user scored the first item negatively, then the predicted score for the second item will be obtained using the aggregated rating of the second item associated with negative ratings of the first item (i.e., the aggregated score calculated at 312). Stated more generally, a prediction of how the user will rate a second item is based on the user's rating of the first item and an aggregate rating of the second item associated with the user's rating of the first item (324). In some embodiments, a prediction of how the user will rate a second media content item is based on the user's rating of the first media content item and either the first aggregate rating of the second item (e.g. from a thumbs up matrix 404 of FIG. 5A) or the second aggregate rating for the second media content item (e.g., from a thumbs down matrix 406 of FIG. 5A). FIG. 5A illustrates two examples of predicting an aggregate rating for a user's unrated item based on the user's rating of another item.

In some embodiments, the server system 103 (FIG. 1) also obtains a rating of a third item from a user (326). The user third item is a part of a pair of items in which the user has not rated the second item in the pair. For example, in some embodiments, the system receives from a user that has not previously rated the second media content item, a rating for the third media content item, such as a "thumbs up" or "thumbs down" rating of a song.

The system then predicts how the user will rate an unrated item based on the user's rating of both the first item and the third item (328). Specifically, the method (350) involves calculating a predicted item score for a second item based on an aggregate rating for the second item associated with the user's rating of the first item and the users rating of the third item (330). For example, if the user scored the first item positively and the third item negatively, then the predicted score for second item will be obtained using a combination of the aggregated rating of the second item associated with positive ratings of the first item (i.e., the aggregate score calculated at 306) as well as an aggregated rating of the second item associated with negative ratings of the third item (i.e., the aggregate score calculated at 318). Stated more generally, a prediction of how the user will rate a second item is based on the user's rating of the first item and an aggregate rating of the second item associated with the user's rating of the first item combined with the user's rating of the third item and an aggregate rating of the second item associated with the user's rating of the first item (330). In some embodiments, a prediction of how the user will rate a second media content item is based on the user's rating of the first media content item and either the first aggregate rating for the second media content item (e.g., from a thumbs up matrix 404 of FIG. 5B) or the second aggregate rating for the second media content item (e.g., from a thumbs down matrix 406 of FIG. 5B), and the user's rating of the third media content item and either the third aggregate rating for the second media content item (e.g., from a thumbs up matrix 404 of FIG. 5B) and fourth aggregate rating for the second media content item (e.g., from a thumbs down matrix 406 of FIG. 5B). An example of predicting an aggregate rating for a user's unrated item based on the user's rating of two other items is provided in FIG. 5B.

It is noted that although step (328) specifically describes the method of using two user ratings in the prediction, the same methodology is employed for three or more user ratings as will be described more generally with respect to the formula below.

Now that predicting aggregate ratings has been described above, some formulaic examples are provided below.

For example, for a listener L, if L rated item A with a rating of −1, then L's expected score for item B, written as S_B, is simply S_B_Aneg. Similarly if L rated A +1, then L's expected score for item B is simply S_B_Apos.

Furthermore, if listener L rated more than one item (say both item C and item A) that each have item pair expected values for item B, then the predicted score for item B is a weighted sum of the these expected values. For example, in the case of L rated item C+1 and item A −1, and where there are 3 other users who rated C+1 and B, and there are 5 other users who rated A −1 and B, then the predicted score for item B is:

$$S\_B = \frac{(3 * S\_B\_Cpos + 5 * S\_B\_Aneg)}{(3 + 5)}$$

Or more generally this formula is expressed as:

$$PQ_{target} = \frac{\sum_{t_i} E(t_{target} | t_i) * |t_{target}|}{\sum_{t_i} |t_{target}|}$$

where $PQ_{target}$ is a target song's predicted score for a particular user, $E(t_{target}|t_i)$ is the expected value of a target song's rating, given a user's other song rating(s), $|t_{target}|$ is the number of rating pairs of song i and song target rated by the same people.

It is noted that although the above formula and example are explained in terms of binary ratings of songs the same formula is also relevant for non-binary ratings of any items (other media content items or otherwise as defined above).

Furthermore, it is noted that in some embodiments, weighting factors may also be included in the formula above to weight some aggregate ratings higher than others. For example, sometimes aggregated ratings based on negative feedback are a stronger indication of users' similarity than aggregated ratings based on positive feedback. For example, the dislike or thumbs down matrixes are better at predicting a user's rating of an unrated song than are the like or thumbs up matrixes. As such, in some embodiments with media content items, the second aggregate and fourth aggregate ratings are weighted higher than the first and third aggregate ratings.

After predicting how a user will rate the second item based on one or more other ratings by the user, the predicted score is utilized to provide a recommendation (332). In some embodiments, the output of the recommendation is a list (e.g., a playlist) of items to recommend to the user. In other embodiments, the recommendation is also a list of items to not recommend to the user. The recommendation and anti-recommendation lists may be ordered according to the each item's predicted scores. In some embodiments, an item that reaches a threshold score is prepared for presentation to the user (334). It is noted that the threshold for preparing an item for presentation may be dependent upon the method performed to obtain the second item's predicted score. For instance, in some embodiments, a first threshold is used when only one user rating is used (i.e., the method of step 322) and a second threshold is used when two or more user ratings are used (i.e., the method of step 328). However, in some embodiments the first and second thresholds are identical. In some embodiments, the first threshold is between 0 and 1. In some embodiments, the second threshold is between 0.2 and 1. It is also noted that the appropriate presentation to the user depends on the nature of the item. For example, in some embodiments, upon predicting that the user will rate the second media content item above a threshold, the second media content item is prepared for playback. In some embodiments, preparing the second media content item for playback includes transmitting the second media content item to a client device.

In some embodiments, the method of (320) to (334) described above, is performed for media content items as follows. A user that has not previously rated the second media content item (e.g., song B), supplies a rating for the first media content item (e.g., song A) (320). Then a prediction is performed of how the user will rate the second media content item (e.g., song B) based on the user's rating of the first media content item and either the first aggregate rating for the second media content item or the second aggregate rating for the second media content item (322). For example, if the user liked song A it is predicted that the user would give song B a score similar to the first aggregate rating for song B. In other words, the user's likely score for song B is predicted to be the average score given to song B by other users who also liked song A, (i.e., the score for song B in the song A like matrix). Then upon predicting that the user will rate the second media content item above a first threshold, the second media content item is prepared for playback (334). It is noted that the optional steps (326)-(330) are omitted from this example because only one user rating was utilized in the prediction (at 324).

In other embodiments, two songs rated by a user are used to predict the user's rating of an unrated song. In these embodiments the method of (320) to (334) described above, is performed for media content items as follows. A user that has not previously rated the second media content item (e.g., song B), supplies a rating for the first media content item (e.g., song A) (320). Also, the user that has not previously rated the second media content item (e.g., song B), supplies a rating for the third media content item (e.g., song C) (326). Then a prediction is performed of how the user will rate the second media content item based on the user's rating of the first media content item and either the first aggregate rating for the second media content item or the second aggregate rating for the second media content item, and the user's rating of the third media content item and either the third aggregate rating for the second media content item and fourth aggregate rating for the second media content item (328). For example, if the user liked song A and didn't like song C then it is predicted that the user would give song B a score similar to the first aggregate rating for song B combined with the fourth aggregate rating of song B. In other words, the user's likely score for song B is predicted to be the average score given to song B by other users who also liked song A combined with the average score given to song B by other users who also disliked song C, (i.e., the score for song B in the song A like matrix combined with the score for song B in the song C dislike matrix). Then upon predicting that the user will rate the second media content item above a second threshold, the second media content item is prepared for playback (334).

In some embodiments, predicting how the user will rate the second media content item (in either step 322 or 328) is performed in under 1 minute. In some embodiments both calculating aggregate ratings and predicting how the user will rate the second media content item is performed in under 5 minutes.

FIG. 4A is block diagram illustrating an example of calculating and storing aggregate ratings for exemplary items based on feedback for item pairs received from a plurality of users as described in FIG. 3A.

Specifically, in FIG. 4A Listeners 1, 2, and 3 have rated song A positively, 408 and have also provided ratings for song C as shown in the Listener-song rating matrix 402. As such, the aggregated rating for song C 410, in the Thumbs-Up matrix 404 for song A is a combination of the ratings for song C. The aggregate rating of song C calculated as:

$$\frac{2(+1)+1(-1)}{(2+1)} = \frac{2-1}{3} = 0.33$$

Similarly, in FIG. 4A Listeners 4, 5, and 6 have rated song A negatively, 412 and have also provided ratings for song D. As such, the aggregated rating for song D 414, in the Thumbs Down matrix 406 for song A is a combination of the ratings for song D. The aggregate rating of song D calculated as:

$$\frac{1(+1)+2(-1)}{(1+2)} = \frac{1-2}{3} = -0.33$$

FIG. 4B is block diagram illustrating another example of calculating and storing aggregate ratings for exemplary items based on feedback for item pairs received from a plurality of users described in FIG. 3A. It is noted that FIG. 4B illustrates how aggregate ratings for numerous item pairs are stored in a single like matrix (which is called a Thumbs-Up matrix 404 in this example).

Specifically, in FIG. 4B Listeners 1, 2, and 3 have rated song A positively 408, and have also provided ratings for song C. As such, the aggregated rating for song C 410, in the Thumps-Up matrix 404 for song A is a combination of the ratings for song C. Likewise, in FIG. 4B, Listeners 4 and 5 have rated song C positively 420, and have also provided ratings for song B and song D. As such, the aggregated rating for song D, in the Thumps-Up matrix for song C is a combination of the ratings for song D 422. The same is true for song B 426. Also, in FIG. 4B, Listener 6 has rated song D positively 424 and has also rated song B, as such the aggregated rating for song B in the Thumps-Up matrix 404 for song D is a combination of ratings for song B 428 (in this example only one rating exists).

FIG. 4C is block diagram illustrating another example of calculating and storing aggregate ratings for exemplary items based on feedback for item pairs received from a plurality of users described in FIG. 3A. It is noted that FIG. 4C illustrates how aggregate ratings for numerous item pairs are stored in a single dislike matrix (which is called a Thumbs-Down matrix 406 in this example).

Specifically, in FIG. 4C Listeners 4, 5, and 6 have rated song B negatively 430, and have also provided ratings for song D. As such, the aggregated rating for song D 432, in the Thumbs-Down matrix 406 for song B is a combination of the ratings for song D 432. Likewise, in FIG. 4C, Listeners 4 and 5 have rated song D negatively 434, and have also provided ratings for song C 436. As such, the aggregated rating for song C, in the Thumbs Down matrix 406 for song D is a combination of the ratings for song C 436. Similarly, Listeners 4 and 5 have rated song D negatively, and have also provided ratings for song B. As such, the aggregated rating for song B, in the Thumbs Down matrix for song D is a combination of the ratings for song B. Other examples are also illustrated in FIG. 4C.

FIG. 5A is block diagram illustrating examples of predicting an aggregate rating for a user's unrated item based on a user's rating of another item as described in FIG. 3B. For example, a rating for song C 502 is predicted based user 10's like rating of song A 504. This predicted rating of song C 502 is obtained from the rating of song C 410 Thumbs Up matrix 404 for song A (because user 10 had Thumbed Up song A 504). Furthermore, a rating for song D 508 is predicted based on user 11's dislike rating of song A 510. This predicted rating of song D 508 is obtained from the rating of song D 414 in the Thumbs Down matrix 406 for song A (because user 11 had Thumbed Down song A 510).

Figure 5B:
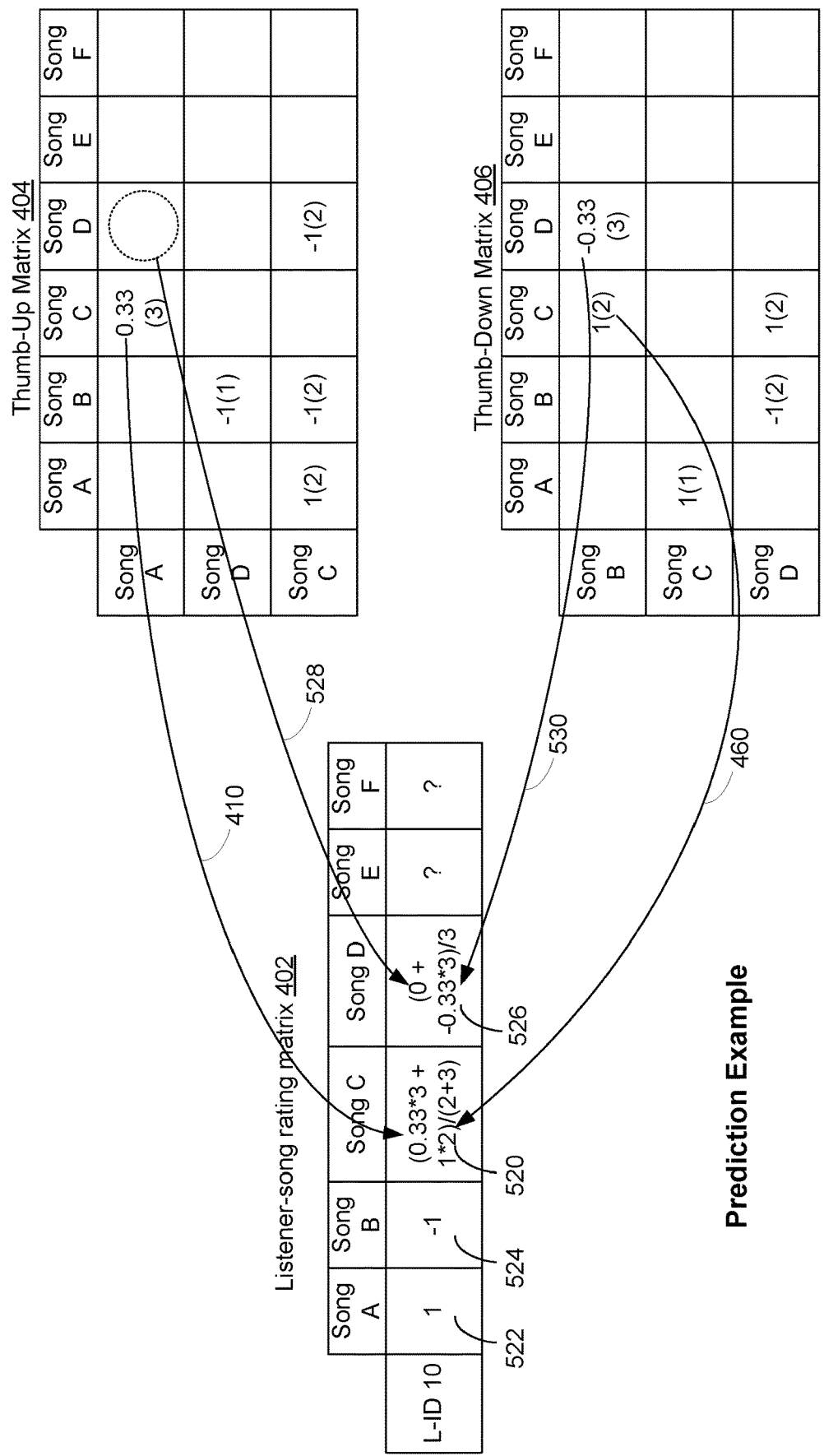
FIG. 5B is block diagram illustrating an example of predicting an aggregate rating for a user's unrated item based on one or more of the user's other ratings as described in FIG. 3B (e.g., a rating for song C is predicted based user 10's like rating of song A and dislike rating of song B, and similarly a rating for song D is predicted based on user 10's like rating of song A and dislike rating of song B).

FIG. 5B is block diagram illustrating an example of predicting an aggregate rating for a user's unrated item based on one or more of the user's other ratings as described in FIG. 3B. For example, a rating for song C 520 is predicted based user 10's like rating of song A 522 and dislike rating of song B 524. Specifically, the predicted rating of song C 520 is a weighted combination of the predicted rating of song C 410 obtained from the Thumbs Up matrix 404 for song A 522, and the predicted rating of song C 460 obtained from the Thumbs Down matrix 406 for song B 524. Similarly, a rating for song D 526 is predicted based on user 10's like rating of song A 522 and dislike rating of song B 524. Specifically, the predicted rating of song D 526 is a weighted combination of the predicted rating of song D 528 obtained from the Thumbs Up matrix 404 for song A and the predicted rating of song D 530 obtained from the Thumbs Down matrix 406 for song B (although as shown in FIG. 5B, since no predicted value for song D 528 is available in the Thumbs Up matrix 404 for song A, the weighted combination for song D 426 is actually equal to the predicted value of song D 530 obtained from the Thumbs Down matrix 406 for song B in this example).

Similarly, although not illustrated in FIG. 5B, it is apparent by analogy that if the user has rated an additional media content item (e.g., song E) the a prediction of how the user will rate the second media content item (e.g., song C) would be based on:

(1) The user's rating of the first media content item (e.g., song A) and either the first aggregate rating for the second media content item or the second aggregate rating for the second media content item. In this example, the first and second aggregate ratings are the ratings for song C in the song A like and dislike matrix respectively, and as such the aggregate rating used in this example would be element 410;

(2) The user's rating of the third media content item (e.g., song B) and either the third aggregate rating for the second media content item and fourth aggregate rating for the second media content item. In this example, the third and fourth aggregate ratings are the ratings for song C in the song B like and dislike matrix respectively, and as such the aggregate rating used in this example would be element 460; and (3) The user's rating of the additional media content item (e.g., song E) and either a fifth or sixth aggregate rating for the second media content item. The fifth and sixth aggregate ratings are the ratings for song C in the song E like and dislike matrix respectively, and as no rating is provided for song E in FIG. 5B the precise aggregate rating to be used is not specified.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of providing a recommendation personalized to a user for a media content item, performed on a server system having one or more processors and memory storing one or more programs for execution by the one or more processors to perform the method, comprising:
    generating for display to a target user, during playback of a first media content item to the target user, a user interface for indicating either a like rating or a dislike rating for the first media content item, the like rating and dislike rating together forming a binary rating scheme;
    receiving from the target user a selection of the like rating for the first media content item;
    obtaining, by the one or more processors, from a like matrix a first score for a target media content item based on ratings provided by a first plurality of users who selected the like rating during playback of the first media content item, the target media content item different from the first content media item, the like matrix including information indicating whether the first plurality of users selected the like rating or the dislike rating from the binary rating scheme during playback of the target media content item;
    generating for display to the target user, during playback of a second media content item to the target user, the user interface including the binary rating scheme;
    receiving from the target user a selection of the dislike rating for the second media content item, the second media content item different from the first media content item and the target media content item;
    obtaining, by the one or more processors, from a dislike matrix a second score for the target media content item based on ratings provided by a second plurality of users who selected the dislike rating during playback of the second media content item, the dislike matrix including information indicating whether the second plurality of users selected the like rating or the dislike rating from the binary rating scheme during playback of the target media content item;
    combining, by the one or more processors, the first score and the second score to produce a recommendation score for the target media content item for the target user; and
    in response to the recommendation score being above a threshold, providing, over a network, the target media content item to the target user.

2. The method of claim 1, wherein the like ratings are assigned a +1 score and dislike ratings are assigned a −1 score, and wherein the first and second scores each fall between a range of −1 and 1.

3. The method of claim 2, wherein the threshold is a between 0 and 1.

4. The method of claim 2, wherein the second score falls between a range of 0 and 1.

5. The method of claim 1, wherein the recommendation score for the target media content item is a weighted average of the first score and the second score based on a number of users in the first plurality of users and a number of users in the second plurality of users.

6. The method of claim 1, wherein the like and dislike ratings are received from a plurality of users on stations associated with a common media input seed.

7. The method of claim 6, wherein the media input seed is selected from the group comprising: a song name, an artist name, an album name, a composer, and a genre.

8. The method of claim 1, further comprising:
    prior to producing the recommendation score for the target media content item, determining that the first media content item and the second media content item have been rated a least a threshold number of times.

9. The method of claim 1, wherein the like and dislike ratings are not binary.

10. The method of claim 1, wherein producing the recommendation score for the target media content item is performed in response to a current request to identify a media content item for playback.

11. The method of claim 1, wherein the first plurality of users and the second plurality of users do not include the target user.

12. A server system, for producing a recommendation score personalized to a user for an item, comprising:
    one or more processors; and
    memory storing one or more programs to be executed by the one or more processors;
    the one or more programs comprising instructions for:
        generating for display to a target user, during playback of a first media content item to the target user, a user interface for indicating either a like rating or a dislike rating for the first media content item, the like rating and dislike rating together forming a binary rating scheme;

receiving from the target user a selection of the like rating for the first media content item;

obtaining, by the one or more processors, from a like matrix a first score for a target media content item based on ratings provided by a first plurality of users who selected the like rating during playback of the first media content item, the target media content item different from the first content media item, the like matrix including information indicating whether the first plurality of users selected the like rating or the dislike rating from the binary rating scheme during playback of the target media content item;

generating for display to the target user, during playback of a second media content item to the target user, the user interface including the binary rating scheme;

receiving from the target user a selection of the dislike rating for the second media content item, the second media content item different from the first media content item and the target media content item;

obtaining, by the one or more processors, from a dislike matrix a second score for the target media content item based on ratings provided by a second plurality of users who selected the dislike rating during playback of the second media content item, the dislike matrix including information indicating whether the second plurality of users selected the like rating or the dislike rating from the binary rating scheme during playback of the target media content item;

combining, by the one or more processors, the first score and the second score to produce a recommendation score for the target media content item for the target user; and in response to the recommendation score being above a threshold, providing, over a network, the target media content item to the target user.

13. The system of claim 12, wherein the recommendation score for the target media content item is a weighted average of the first score and the second score based on a number of users in the first plurality of users and a number of users in the second plurality of users.

14. A non-transitory computer readable storage medium storing one or more programs configured for execution by a server system, the one or more programs comprising instructions for:

generating for display to a target user, during playback of a first media content item to the target user, a user interface for indicating either a like rating or a dislike rating for the first media content item, the like rating and dislike rating together forming a binary rating scheme;

receiving from the target user a selection of the like rating for the first media content item;

obtaining, by a processor, from a like matrix a first score for a target media content item based on ratings provided by a first plurality of users who selected the like rating during playback of the first media content item, the target media content item different from the first content media item, the like matrix including information indicating whether the first plurality of users selected the like rating or the dislike rating from the binary rating scheme during playback of the target media content item;

generating for display to the target user, during playback of a second media content item to the target user, the user interface including the binary rating scheme;

receiving from the target user a selection of the dislike rating for the second media content item, the second media content item different from the first media content item and the target media content item;

obtaining, by the processor, from a dislike matrix a second score for the target media content item based on ratings provided by a second plurality of users who selected the dislike rating during playback of the second media content item, the dislike matrix including information indicating whether the second plurality of users selected the like rating or the dislike rating from the binary rating scheme during playback of the target media content item;

combining, by the processor, the first score and the second score to produce a recommendation score for the target media content item for the target user; and in response to the recommendation score being above a threshold, providing, over a network, the target media content item to the target user.

15. The system of claim 12, wherein the like ratings are assigned a +1 score and dislike ratings are assigned a −1 score, and wherein the first and second scores each fall between a range of −1 and 1.

16. The system of claim 12, wherein the like and dislike ratings are received from a plurality of users on stations associated with a common media input seed.

17. The system of claim 12, wherein the one or more programs further comprise instructions for determining that the first media content item and the second media content item have been rated a least a threshold number of times prior to producing the recommendation score for the target media content item.

18. The non-transitory computer readable storage medium of claim 14, wherein the like ratings are assigned a +1 score and dislike ratings are assigned a −1 score, and wherein the first and second scores each fall between a range of −1 and 1.

19. The non-transitory computer readable storage medium of claim 14, wherein the recommendation score for the target media content item is a weighted average of the first score and the second score based on a number of users in the first plurality of users and a number of users in the second plurality of users.

20. The non-transitory computer readable storage medium of claim 14, wherein the one or more programs further comprise instructions for determining that the first media content item and the second media content item have been rated a least a threshold number of times prior to producing the recommendation score for the target media content item.

* * * * *

UNITED STATES PATENT AND TRADEMARK OFFICE
CERTIFICATE OF CORRECTION

PATENT NO. : 10,540,396 B2  
APPLICATION NO. : 15/150240  
DATED : January 21, 2020  
INVENTOR(S) : Tao Ye et al.

Page 1 of 1

It is certified that error appears in the above-identified patent and that said Letters Patent is hereby corrected as shown below:

In the Claims

Column 22, Claim 8, Line 49 change "content item have been rated a least a threshold number of times." to read as -- content item have been rated at least a threshold number of times. --

Column 24, Claim 20, Line 57 change "content item have been rated a least a threshold number of times prior to" to read as -- content item have been rated at least a threshold number of times prior to --

Signed and Sealed this  
Twenty-ninth Day of December, 2020

Andrei Iancu  
*Director of the United States Patent and Trademark Office*